Figure 1:

United States Patent [19]
Müller et al.

[11] Patent Number: 5,951,962
[45] Date of Patent: Sep. 14, 1999

[54] MESOPOROUS SILICA, ITS PREPARATION AND ITS USE

[75] Inventors: Ulrich Müller, Neustadt; Bernd Reck, Grünstadt; Joachim Roser, Mannheim, all of Germany

[73] Assignee: BASF Aktiengesellschaft, Ludwigshafen, Germany

[21] Appl. No.: 08/935,657

[22] Filed: Sep. 23, 1997

[30] Foreign Application Priority Data

Sep. 23, 1996 [DE] Germany .......................... 196 39 016

[51] Int. Cl.⁶ .................................................. C01B 37/02
[52] U.S. Cl. ............................................ 423/702; 423/335
[58] Field of Search ................................. 423/702, 335; 502/232

[56] References Cited

U.S. PATENT DOCUMENTS

| | | | |
|---|---|---|---|
| 3,993,590 | 11/1976 | Andre et al. | 252/430 |
| 4,230,679 | 10/1980 | Mahler et al. | 423/325 |
| 4,255,286 | 3/1981 | Berck et al. | 252/448 |
| 4,752,458 | 6/1988 | Roninson | 423/335 |
| 5,057,296 | 10/1991 | Beck | 423/277 |
| 5,318,790 | 6/1994 | Houston et al. | 426/423 |
| 5,382,558 | 1/1995 | Inagaki et al. | 502/407 |
| 5,391,364 | 2/1995 | Cogliati | 423/335 |
| 5,643,624 | 7/1997 | Aldcroft et al. | |
| 5,672,556 | 9/1997 | Pinnavaia et al. | 502/63 |

FOREIGN PATENT DOCUMENTS

| | | |
|---|---|---|
| 670 286 | 9/1995 | European Pat. Off. . |
| 3088711 | 4/1991 | Japan . |
| 4193708 | 7/1992 | Japan . |
| 5085762 | 4/1993 | Japan . |
| 138013 | 5/1995 | Japan . |
| 08034607 | 2/1996 | Japan . |
| 8173137 | 7/1996 | Japan . |
| 1371440 | 10/1974 | United Kingdom . |
| 86/07345 | 12/1986 | WIPO . |

OTHER PUBLICATIONS

Schacht et al., "Oil–Water Interface Templating of Mesoporous Macroscale Structures," Science, vol. 273, pp. 768–771, Aug. '96.
Ullmann, Enc. der chem., 4$^{th}$ Ed., 1982, vol. 21, 457–463, (no month).
Nature 359 (Oct. 1992), 710–712, Kresge et al.

Primary Examiner—Mark L. Bell
Assistant Examiner—David Sample
Attorney, Agent, or Firm—Keil & Weinkauf

[57] ABSTRACT

Mesoporous silica has a specific surface area of the mesopores of at least 500 m$^2$/g and a volume of the mesopores of at least 1.0 ml/g and is prepared by converting a silica precursor in a water-containing reaction medium, the reaction medium containing a polymer dispersion.

3 Claims, 3 Drawing Sheets

0.2 μm

MESOPOROUS SILICA, ITS PREPARATION AND ITS USE

The present invention relates to mesoporous silica having a specific surface area of the mesopores of at least 500 m²/g and a volume of the mesopores of at least 1.0 ml/g. The present invention furthermore relates to processes for the preparation of the mesoporous silica, its use and moldings and catalysts thereof.

The preparation of silicas and silica gels by industrial processes is described in Ullmann, Encyklopädie der technischen Chemie, 4th Edition, 1982, Volume 21, pages 457–463.

Wide-pore silica gels having a pore volume of more than 0.8 ml/g, a specific surface area of 200–400 m²/g and a pore diameter of 8–10 nm and narrow-pore silica gels having a pore volume of less than 0.5 ml/g, a specific surface area of 600–800 m²/g and a pore diameter of 2–2.5 nm have been described.

Nature, 359 (1992), 710–712, discloses aluminosilicates having a large surface area and sharp pore size distribution, which are designated as MCM-41. For an aluminosilicate having a pore diameter of 4.5 nm, a BET surface area of more than 1000 m²/g and a pore volume of 0.79 cm³/g were found. Further aluminosilicates having pore sizes of 3 nm and 4 nm are mentioned. The X-ray diffraction pattern shows characteristic sharp bands in the range $2\theta=2-4°$. In addition, the aluminosilicates have a step in the nitrogen adsorption isotherm in the range $p/p_0=0.2-0.4$. The aluminosilicates are synthesized with the use of hexadecyltrimethylammonium salts as cationic surfactants.

Further processes for the preparation of mesoporous molecular sieves are described in EP-A-0 670 286. Here, anionic surfactants and isopoly or heteropoly cations of certain metal oxides which differ from silica are used for the synthesis.

After the synthesis of the mesoporous oxides prepared as above in the presence of surfactants, the surfactants are removed thermally, for example by combustion in the presence of oxygen. In the preparation of the mesoporous oxides, precursors or intermediates frequently contain up to about 30–60% by weight of surfactants, which have to be removed after the synthesis. On the one hand, the surfactants are expensive and, on the other hand, their removal is complicated.

In addition, the diameters of the mesopores are limited to the range of 2–6 nm in the predominant number of cases. However, for many applications, for example as heterogeneous catalysts, oxides having larger pores are desirable in order to ensure good mass transfer for fast reactions. In the case of catalysts based on silica gel, such pore sizes are occasionally reached, but the pore diameters have a broad distribution and the specific surface areas are very small.

It is an object of the present invention to provide mesoporous oxide elements having a high proportion of mesopores which possess a large specific surface area and a large pore volume as well as a large mean pore size in the mesopore range.

We have found that this object is achieved by the mesoporous silicas stated at the outset. We have furthermore found that these objects are achieved by a process for the preparation of mesoporous silica by converting a silica precursor in a water-containing reaction medium which contains a polymer dispersion. The disadvantages of the known processes described at the outset do not occur.

We have found that mesoporous silica can be obtained if a silica precursor is converted into silica in the presence of a polymer dispersion.

The mesoporous silicas obtained have a specific surface area of the mesopores of at least 500, preferably at least 800, particularly preferably at least 1000, in particular at least 1250, m²/g. The specific surface areas may be 500–2000, preferably 1000–2000, in particular 1250–1600, m²/g. The volume of the mesopores is at least 1.0, preferably at least 1.5, in particular at least 2, ml/g. The pore volume may be 1.0–3.0, preferably 1.5–3.0, in particular 2.0–3.0, ml/g. Mesopores are understood as meaning pores having a pore diameter of 2–50 nm. The pore diameters and specific surface areas of the mesopores are measured by nitrogen adsorption at 77K. The pore surface area can be calculated using the BJH model. The pore volume is determined at a relative pressure of $p/p_0=0.98$.

The maximum of the pore diameter distribution of the mesopores of the novel mesoporous silicas is preferably at least 3 nm, particularly preferably at least 5 nm, in particular at least 8 nm. Once again, the pore diameter distribution can be determined by nitrogen adsorption at 77K.

The main proportion of the mesopores preferably have a diameter of 2–50 nm, particularly preferably 4–30 nm, in particular 6–20 nm. The main proportion refers to the main proportion of the pore volume, the pore diameter being determined by nitrogen adsorption at 77K. Pore sizes, pore volumes and surface areas relate to calcined silica.

The novel mesoporous silica preferably have no characteristic step in the range $p/p_0=0.2-0.4$ in the nitrogen adsorption. This shows that the silicas have a very good mesoporous structure.

The novel mesoporous silicas preferably have a nitrogen adsorption isotherm at 77K with a sharp increase or a step in the range $p/p_0=0.5-1.0$, preferably 0.6–0.95. In particular, the adsorption curve shows a sharp increase in the range $p/p_0=0.8-0.95$, and the desorption curve a sharp increase in the range $p/p_0=0.6-0.8$. Preferably, both adsorption curve and desorption curve have only one step or one sharp increase each.

The X-ray diffraction pattern was obtained using Cu—Kα radiation with a wavelength of 0.15406 nm.

The X-ray diffraction pattern of the novel mesoporous silicas has no sharp signals in the range $2\theta>4°$, in particular $2\theta=2-4°$. In addition, the diffraction pattern has no sharp signals or reflections in the range $2\theta=20-25°$. Preferably, the X-ray diffraction pattern has a sharp increase in the line intensity in the range $2\theta<6°$, in particular $2\theta<4°$. The largest part of the X-ray diffraction pattern is in the range $2\theta<6°$.

The novel mesoporous silica can be prepared by converting a silica precursor in a water-containing reaction medium which contains a polymer dispersion. The silicas thus prepared are preferably calcined.

Any polymer obtainable by free radical polymerization may be used for the polymer dispersion. In general, said polymer is a polymer obtained by emulsion polymerization. However, it is also possible, in the same way, to use polymers which are obtainable by another polymerization method, for example by suspension polymerization. The polymer is preferably used in the form of a dispersion which has, in particular, a polymer content of from 40 to 80, especially from 50 to 75, % by weight. This may be a primary dispersion, ie. a dispersion as obtained in the emulsion polymerization, or a secondary dispersion, ie. a dispersion which has been obtained by subsequent dispersing of a previously isolated polymer in the dispersion medium.

The dispersion medium is as a rule water. However, it may also contain water-miscible organic solvents, such as alcohols and ketones, for example methanol, ethanol, n-propanol, isopropanol, n-butanol, acetone or methyl ethyl ketone. The polymers are preferably prepared by free radical polymerization of α,β-ethylenically unsaturated monomers.

Examples of suitable monomers are:

α,β-Ethylenically unsaturated mono- and dicarboxylic acids, in particular those of 3 to 6 carbon atoms. Examples of these are acrylic acid, methacrylic acid, crotonic acid, fumaric acid, maleic acid, 2-methylmaleic acid and itaconic acid, and half-esters of ethylenically unsaturated dicarboxylic acids, such as monoalkyl maleates of $C_1$–$C_8$-alkanols;

Vinylaromatic compounds, such as styrene, α-methylstyrene and vinyltoluenes;

Linear 1-olefins, branched 1-olefins or cyclic olefins, eg. ethene, propene, butene, isobutene, pentene, cyclopentene, hexene, cyclohexene, octene, 2,4,4-trimethyl-1-pentene, $C_8$–$C_{10}$-olefins, 1-dodecene, $C_{12}$–$C_{14}$-olefins, octadecene, 1-eicosene ($C_{20}$), $C_{20}$–$C_{24}$-olefins, oligoolefins prepared by metallocene catalysis and having a terminal double bond, for example oligopropene, oligohexene and oligooctadecene; olefins prepared by cationic polymerization and having a high α-olefin content, for example polyisobutene;

Butadiene;

Vinyl and allyl alkyl ethers where the alkyl radical is of 1 to 40 carbon atoms and may carry further substituents, such as a hydroxyl, amino or dialkylamino group or one or more alkoxylate groups, eg. methyl vinyl ether, ethyl vinyl ether, propyl vinyl ether, isobutyl vinyl ether, 2-ethylhexyl vinyl ether, vinylcyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether and the corresponding allyl ethers and mixtures thereof;

Acrylamides and allyl-substituted acrylamides, eg. acrylamide, methacrylamide, N-tert-butylacrylamide and N-methyl(meth)acrylamide;

Sulfo-containing monomers, eg. allylsulfonic acid, methallylsulfonic acid, styrene sulfonate, vinylsulfonic acid, allyloxybenzenesulfonic acid, 2-acrylamido-2-methylpropanesulfonic acid, corresponding alkali metal or ammonium salts thereof and mixtures thereof;

$C_1$–$C_8$-Alkyl esters or $C_1$–$C_4$-hydroxyalkyl esters of $C_3$–$C_6$-mono- or dicarboxylic acids (see above), in particular of acrylic acid, methacrylic acid or maleic acid, or esters of $C_1$–$C_{18}$-alcohols, alkoxylated with from 2 to 50 mol of ethylene oxide, propylene oxide, butylene oxide or mixtures thereof, with the stated acids, eg. methyl (meth) acrylate, ethyl (meth)acrylate, propyl (meth)acrylate, isopropyl (meth)acrylate, butyl (meth)acrylate, hexyl (meth) acrylate, 2-ethylhexyl (meth)acrylate, hydroxyethyl (meth)acrylate, hydroxypropyl (meth)acrylate, butyne-1, 4-diol monoacrylate, dibutyl maleate, ethyldiglycol acrylate, methylpolyglycol acrylate (11 EO), (meth) acrylates of $C_{13}$/$C_{15}$-oxo alcohol reacted with 3, 5, 7, 10 or 30 mol of ethylene oxide, and mixtures thereof;

Alkylaminoalkyl (meth)acrylates or alkylaminoalkyl (meth) acrylamides, eg. 2-(N,N-dimethylamino)ethyl (meth) acrylate, 3-(N,N-dimethylamino)propyl (meth)acrylate, 2-(N,N,N-trimethylammonium)ethyl (meth)acrylate chloride, 2-dimethylaminoethyl (meth)acrylamide, 3-dimethylaminopropyl (meth)acrylamide, 3-trimethylammonium propyl (meth)acrylamide chloride and the quaternization products thereof, for example with dimethyl sulfate, diethyl sulfate or other alkylating agents, vinyl and allyl esters of $C_1$–$C_{30}$-monocarboxylic acids, eg. vinyl formate, vinyl 2-ethylhexanoate, vinyl nonanoate, vinyl decanoate, vinyl pivalate, vinyl palmitate, vinyl stearate and vinyl laurate.

Examples of further monomers are:

N-Vinylformamide, N-vinyl-N-methylformamide, styrene, α-methylstyrene, 3-methylstyrene, butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole and mixtures thereof. Quaternization products of the stated N-vinylimidazole monomers with dimethyl sulfate, diethyl sulfate or other alkylating agents.

Preferred further monomers are the stated esters of acrylic acid and methacrylic acid, the vinylaromatic compounds, butadiene, vinyl esters, (meth)acrylonitrile and the stated (meth)acrylamides.

Particularly preferred comonomers are methyl acrylate, ethyl acrylate, butyl acrylates, 2-ethylhexyl acrylate, methyl methacrylate, butyl methacrylates, hydroxyethyl acrylate, hydroxypropyl acrylate, hydroxybutyl acrylates, hydroxyethyl methacrylate, styrene, butadiene, vinyl acetate, acrylonitrile, methacrylonitrile, acrylamide, methacrylamide and/or N-butylacrylamide.

The polymers can be prepared by conventional polymerization processes, for example by free radical mass, emulsion, suspension, dispersion, solution and precipitation polymerization. The stated polymerization processes are preferably carried out in the absence of oxygen, preferably in a stream of nitrogen. The conventional apparatuses, for example stirred kettles, stirred kettle cascades, autoclaves, tube reactors and kneaders, are used for all polymerization methods. The emulsion, precipitation or suspension polymerization method is preferably used.

Free radical emulsion polymerization in an aqueous medium is the particularly preferred method.

When aqueous emulsion polymerization is used, polymers having a weight average molecular weight of from 1000 to 2,000,000, preferably from 5000 to 500,000, are obtained. The K values are in general from 15 to 150 (1% strength by weight in dimethylformamide). The mean particle size determined by means of light scattering (autosizer) is from 20 to 1000 nm, preferably from 30 to 700 nm, particularly preferably from 40 to 400 nm. The dispersion may have a monomodal or polymodal particle size distribution. The emulsion polymerization can be carried out in a manner such that the solids volume content is from 10 to 70%, preferably from 20 to 60%.

The polymerization is preferably carried out in the presence of compounds (initiators) forming free radicals. Preferably from 0.05 to 15, particularly preferably from 0.2 to 8, % by weight, based on the monomers used in the polymerization, of these compounds are required.

Examples of suitable polymerization initiators are peroxides, hydroperoxides, peroxodisulfates, percarbonates, peroxoesters, hydrogen peroxide and azo compounds. Examples of initiators, which may be water-soluble or water-insoluble, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumyl hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfate, azobisisobutyronitrile, 2,2'-azobis(2-amidinopropane) dihydrochloride, 2-(carbamoylazo)isobutyronitrile and 4,4-azobis(4-cyanovaleric acid). The known redox initiator system may also be used as polymerization initiators.

The initiators may be used alone or as a mixture with one another, for example mixtures of hydrogen peroxide and sodium peroxodisulfate. Water-soluble initiators are preferably used for the polymerization in an aqueous medium.

In order to prepare polymers having a low average molecular weight, it is often advantageous to carry out the copolymerization in the presence of regulators. Conventional regulators may be used for this purpose, for example organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$–$C_4$-aldehydes, such as formaldehyde, acetaldehyde or propionaldehyde, hydroxylammonium salts, such as hydroxylammonium sulfate, formic acid, sodium bisulfite or isopropanol. The polymerization regulators are used in general in amounts of from 0.1 to 10% by weight, based on the monomers.

In order to prepare relatively high molecular weight or crosslinked copolymers, it is often advantageous to carry out the polymerization in the presence of crosslinking agents. Such crosslinking agents are compounds having two or more ethylenically unsaturated groups, for example diacrylates or dimethacrylates of at least dihydric saturated alcohols, eg. ethylene glycol diacrylate, ethylene glycol dimethacrylate, 1,2-propylene glycol diacrylate, 1,2-propylene glycol dimethacrylate, neopentylglycol dimethacrylate, 3-methylpentanediol diacrylate and 3-methylpentanediol dimethacrylate. The acrylates and methacrylates of alcohols having more than 2 OH groups may also be used as crosslinking agents, for example trimethylolpropane triacrylate or trimethylolpropane trimethacrylate. A further class of crosslinking agents comprises diacrylates or dimethacrylates of polyethylene glycols or polypropylene glycols, each having molecular weights of from 200 to 9000.

In addition to the homopolymers of ethylene oxide or of propylene oxide, block copolymers of ethylene oxide and propylene oxide or copolymers of ethylene oxide and propylene oxide which contain the ethylene oxide and propylene oxide units in random distribution may also be used. The oligomers of ethylene oxide or propylene oxide are also suitable for the preparation of the crosslinking agents, for example diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Other suitable crosslinking agents are vinyl acrylate, vinyl methacrylate, vinyl itaconate, divinyl adipate, butanediol divinyl ether, trimethylolpropane trivinyl ether, allyl acrylate, allyl methacrylate, pentaallylsucrose, methylenebis(meth)acrylamide, divinylethyleneurea, divinylpropyleneurea, divinylbenzene, divinyldioxane, triallyl cyanurate, tetraallylsilane, tetravinylsilane and bis- and polyacrylylsiloxanes (eg. Tegomere® from Th. Goldschmidt AG). The crosslinking agents are preferably used in amounts of from 0.05 to 50, preferably from 0.1 to 20, in particular from 0.5 to 10, % by weight, based on the monomers to be polymerized.

If the emulsion, precipitation, suspension or dispersion polymerization method is employed, it may be advantageous to stabilize the polymer droplets or polymer particles by means of surfactant assistants. Typically, emulsifiers or protective colloids are used for this purpose. Anionic, nonionic, cationic and amphoteric emulsifiers are suitable.

Anionic emulsifiers are preferred, for example alkylbenzenesulfonic acids, sulfonated fatty acids, sulfosuccinates, fatty alcohol sulfates, alkylphenol sulfates and fatty alcohol ether sulfates. Nonionic emulsifiers used may be, for example, alkylphenol ethoxylates, primary alcohol ethoxylates, fatty acid ethoxylates, alkanolamide ethoxylates, fatty amine ethoxylates, EO/PO block copolymers and alkylpolyglucosides. For example, the following are used as cationic or amphoteric emulsifiers: quaternized aminoalkoxylates, alkylbetaines, alkylamidobetaines and sulfobetaines. Long-chain quaternary amines, for example fatty amines quaternized with dimethyl sulfate, are also suitable.

Typical protective colloids are, for example, cellulose derivatives, polyethylene glycol, propylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylamine, polyvinylformamide, polyvinylimidazole, polyvinylsuccinimide, polyvinyl-2-methylsuccinimide, polyvinyl-1,3-oxazolid-2-one, polyvinyl-2-methylimidazoline and copolymers containing acrylic acid, methacrylic acid, maleic acid or maleic anhydride. The emulsifiers or protective colloids are usually used in concentrations of from 0.05 to 20% by weight, based on the monomers.

If polymerization is effected in an aqueous emulsion or dilution, the monomers or emulsifiers can be completely or partially neutralized by conventional, inorganic or organic bases or acids before or during the polymerization. Examples of suitable bases are alkali metal or alkaline earth metal compounds, such as sodium, potassium or calcium hydroxide or sodium carbonate, or ammonia and primary, secondary or tertiary amines, such as di- or triethanolamine. Suitable acids are, for example, hydrochloric acid, sulfuric acid, phosphoric acid, formic acid and acetic acid.

Cationic aqueous polymer dispersions which are stabilized with cationic emulsifiers and/or cationic auxiliary monomers (emulsifiers or $\alpha,\beta$-ethylenically unsaturated monomers which contain quaternary amine or ammonium structures) are particularly preferably used. These emulsion polymers are preferably prepared using free radical initiators containing cationic groups.

Particularly preferred monomers are methyl methacrylate, styrene, n-butyl acrylate, butanediol diacrylate, and N,N-dimethylaminoethyl methacrylate quaternized with diethyl sulfate. The polymer dispersion preferably contains polymers having basic building blocks of methyl methacrylate, butanediol diacrylate and/or dimethylaminoethyl methacrylate quaternized with diethyl sulfate.

The polymerization can be carried out in a conventional manner, continuously or batchwise, by a large number of methods. If the polymer is prepared by a solution, precipitation or suspension polymerization method in a steam-volatile solvent or solvent mixture, the solvent can be separated off by passing in steam in order thus to obtain an aqueous solution or dispersion. The polymer can be isolated from the organic diluent also by a drying process.

The polymer may be, for example, a rubber, such as an epichlorohydrin rubber, ethylene vinyl acetate rubber, chlorosulfonated polyethylene rubber, silicone rubber, polyether rubber, diene rubber, such as butadiene rubber, acrylate rubber, ethylene/propylene rubber, ethylene/propylene/diene rubber, butyl rubber or a similar rubber.

In the case of secondary dispersions, polymers not prepared by free radical polymerization, for example polysiloxanes, polyurethanes and polyesters, may also be used.

The glass transition temperature of the novel polymer dispersions (measured in the dry state by means of DSC) is from −50 to +150° C., preferably from 0 to 110° C.

The concentration of the polymer in the reaction medium is preferably 0.05–20, particularly preferably 0.25–10, in particular 0.5–10, especially 0.5–5, % by weight, based on the total reaction mixture. In a two-phase reaction medium, the polymer dispersion is particularly preferably present in the water-containing or aqueous phase.

The reaction medium used may be any suitable water-containing reaction medium. For example, water may be employed as the reaction medium. Moreover, a mixture of water with a water-soluble organic solubilizer, such as a lower alcohol, eg. ethanol or isopropanol, may be used. The reaction can also be effected in a two-phase reaction medium which consists of an aqueous phase and an organic phase which is immiscible or only slightly miscible with water. In relation to the reaction, the organic phase should be inert. The water-containing reaction medium or the two-phase mixture may be agitated, in particular stirred, during the reaction; however, a reaction may also take place in the non-agitated phase, in particular at the phase boundary of a two-phase system. If the reaction is carried out at a stationary interface, the mesoporous silica can be obtained in the form of thin films or layers. The oxide films or oxide layers thus obtained can be used in membrane, separation and purification processes or in applications for information storage. Corresponding films or layers may also be suitable for electronic, optical or electro-optical applications. The membranes may furthermore be used for catalytic reactions in membrane reactors or in reactive distillations.

The silica precursors used may be any suitable compounds which give silica as a result of a physical or chemical treatment. Examples are organic silicon compounds, in particular hydrolyzable organic silicon compounds, such as alcoholates or chelates. In addition, silica precursor can be used in the form of a soluble salt or colloid, as well as in the form of waterglass or pyrogenic silica.

Organic silicon compounds in the form of tetraalcoholates, such as tetramethoxysilicon or tetraethoxysilicon, are preferably used. The tetraalkoxysilicon compound, in particular $C_1$–$C_4$-alkoxy compound, may be initially taken in the organic solvent and reacted at the phase boundary in a two-phase reaction medium. The mesoporous silica forms at the phase boundary of the immiscible phases. During mixing of the reaction medium, in particular during stirring of the reaction medium, an emulsion either of the organic solvent in water or of water in the organic solvent forms. By varying the intensity of mixing or the stirrer speed during mechanical stirring, the type and size of the resulting silica particles can be determined so that moldings of silica are obtainable. If a carrier is introduced as a reaction medium in the region of the boundary layer between two different phases, the mesoporous silica can be deposited on this carrier. For example, the carrier may be an inert porous carrier, such as a porous glass, alumina, silica gel or clay, ceramic, metal or a metal packing, as used, for example, for static mixers. This inert carrier can thus be coated or impregnated with the mesoporous silica, giving composite materials which have good mechanical stability, in particular in comparison with carrier-free mesoporous oxide moldings.

The preparation of moldings from the novel mesoporous silica can also be carried out after the reaction. Mesoporous silica obtained in the reaction, in particular in powder form, is converted into the desired molding by suitable measures. Suitable processes are known; for example, the mesoporous silica can be mixed with a binder and the mixture tabletted. Shaping by extrusion is also possible.

The reaction medium may contain further additives, for example metal or noble metal ions. For example, ions of the elements Al, B or Ge, of groups IIIa, IIb, IVb, Vb or VIb of the Periodic Table of Elements, Be, Sn, Pb, Bi, Cu, Fe, Co, Ni, Ce, Mn or mixtures thereof are suitable. In the case of two-phase reaction media, the metal ions may be present in one of the two phases or in both phases. It is thus possible to introduce catalytically active metals into the mesoporous silica or moldings prepared therefrom, for example for applications as a catalyst. It is also possible to introduce enzymes, for example for biotechnological applications, into the water-containing reaction medium or the aqueous phase of a two-phase reaction medium, said enzymes then being incorporated by cocondensation. The inclusion of pharmacologically active substances, such as pharmaceutical active compounds, is also possible owing to the mild reaction conditions. Thus, it is possible to prepare mesoporous silicas or corresponding moldings which release a pharmaceutically active compound in a controlled manner for a certain application.

Furthermore, pigments can be introduced into the reaction medium and are then present in the mesoporous silica or moldings thereof. Thus, it is possible to prepare colored silica or moldings thereof.

The reaction is preferably carried out at from −10 to +150° C., preferably from 10 to 90° C., particularly preferably from 20 to 65° C. The reaction can be carried out at atmospheric, reduced or superatmospheric pressure, for example at 0.4–300 bar. The reaction is preferably carried out at atmospheric pressure.

The novel process can be carried out at basic, acidic or neutral pH. An acidic pH is preferably employed, in particular a pH of from 5 to 1.

The mesoporous silicas obtained after the reaction, or moldings produced therefrom, can be calcined according to the invention, for example in order to use them as catalysts or catalyst carriers. Calcination is effected, according to the invention, preferably at 300–600° C., particularly preferably 400–450° C. The period for the calcination may be 0.5–20, preferably 2–8, hours. If necessary, a drying step may be included prior to the calcination, in order to obtain a dry silica. The mesoporous silicas used according to the invention for the calcination have only a small proportion of polymer from the polymer dispersion. The proportion of polymer dispersion in the dried silica prior to the calcination is preferably from 5 to 200, particularly preferably from 30 to 150, % by weight, based on the total mass of silica and polymer.

The novel mesoporous silicas or moldings prepared therefrom or therewith or coated therewith can be used in a large number of applications. The oxide films or layers formed during the synthesis in an unagitated two-phase reaction medium can be used as self-supporting membranes, as stated above.

In addition, the mesoporous silica or moldings prepared therefrom can be used as catalysts or catalyst carriers. The catalysts contain the novel mesoporous silica as a carrier or as active substance. Examples of suitable catalytic reactions are the introduction of oxy functions into hydrocarbons, the oxidation of olefins to oxiranes, the alkylation of aromatics, hydrogenations, dehydrogenations, hydrations, dehydrations, isomerizations, addition and elimination reactions, nucleophilic and electrophilic substitution reactions, dehydrocyclizations, hydroxylations of heteroatoms and aromatics, epoxide-aldehyde rearrangements, aminations of monomeric and oligomeric olefins, condensation reactions of the aldol type, polymerization reactions, esterifications and etherification reactions, as well as catalytic reactions of waste gases and stack gases or the removal of oxides of nitrogen. The use for the carrying and sustained release of drugs as well as for the carrying of pigments, which, for example, are present in encapsulated form in the mesoporous oxide molding, has been described above. Other possible uses are as sorbents and for the production of oxide ceramics or for the separation of substances. The surface characteristics of the novel mesoporous silicas or moldings thereof can be controlled by the type of dispersion used. The dispersion may thus serve as a sort of die or mold for the surface structure obtained.

Figure 2:
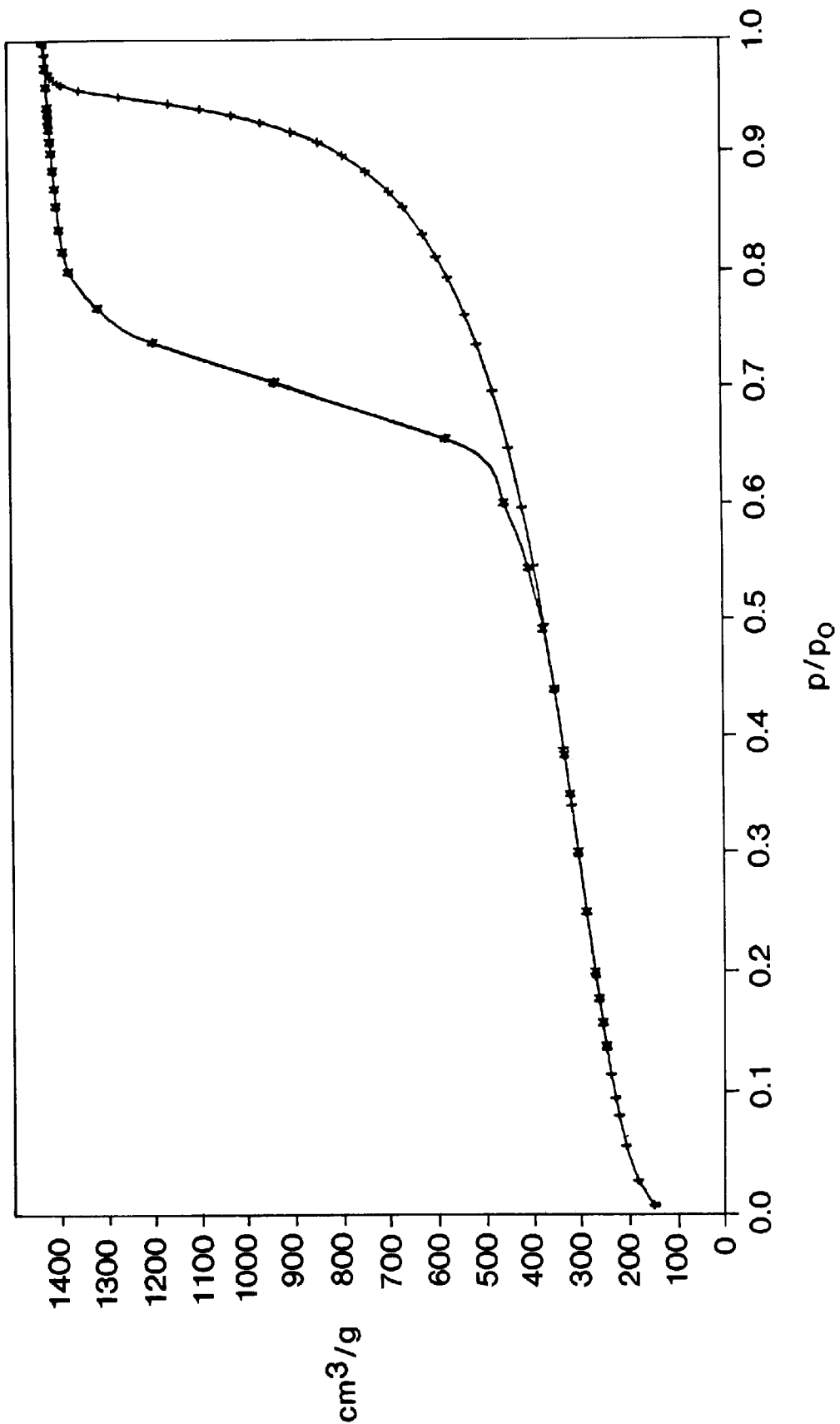
Figure 3:
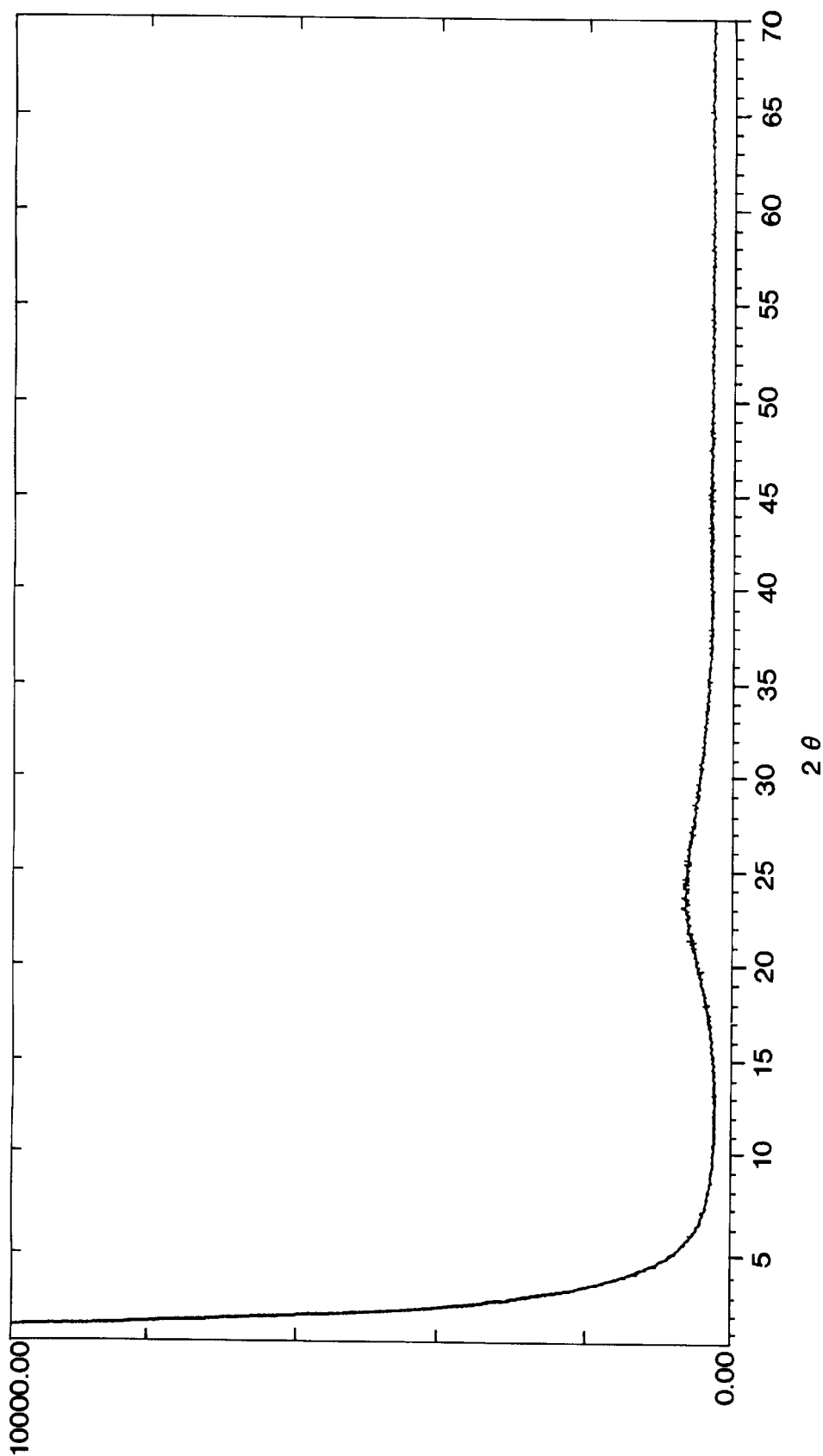

The invention is illustrated below with reference to an example and a drawing, in which FIG. 1 shows a transmission electron micrograph of a novel mesoporous silica as obtained according to the Example, FIG. 2 shows a nitrogen adsorption isotherm for the mesoporous silica from the Example and FIG. 3 shows an X-ray diffraction pattern for the mesoporous silica from the Example.

EXAMPLE 84 g of tetraethoxysilane (from Merck), 120 g of ethanol and 24.4 g of isopropanol were mixed in a 2 l four-necked flask while stirring. A mixture of 20 g of the polymer dispersion below in 260 g of demineralized water was added dropwise to this mixture. The resulting white suspension was stirred for 20 hours at room temperature. It was then filtered and the filter cake was washed with water and dried in air at room temperature and then for 16 hours at 60° C. The dried material was then calcined for 5 hours at 500° C. in air. 1.9 g of calcined product were obtained.

Preparation of the Polymer Dispersion 84.3 g of water and 100 g of Lipamin® OK (from BASF, 40% strength aqueous emulsifier solution) were initially taken in a 3 l glass polymerization vessel equipped with an anchor stirrer and heated to 80° C. After the apparatus had been flushed with nitrogen, a feed 1 was added continuously to the polymerization vessel in the course of 3 hours at 80° C. while stirring at 120 rpm, and a feed 2 at a separate point in space in the course of 3.5 hours. Polymerization was then continued for a further 0.5 hour at 80° C. and the mixture was then cooled.

| Feed 1: | 871 g of water |
| --- | --- |
| | 100 g of Lipamin OK (from BASF, 40% strength aqueous emulsifier solution) |
| | 720 g of methyl methacrylate |
| | 40 g of 1,4-butanediol diacrylate |
| | 80 g of a 50% strength aqueous solution of N,N-dimethylaminoethyl methacrylate, quaternized with diethyl sulfate |
| Feed 2: | 150 g of water |
| | 8 g of azo initiator V 50 (from Wako Chemicals GmbH) |

A polymer dispersion which had a solids content of 30.1%, a light transmittance of 78 and a pH of 6.4 was obtained. The particle size was 232 nm, determined using an autosizer from Malvern.

The transmission electron micrograph in FIG. 1 shows a regular structure of the resulting silica with islands of 50–100 nm diameter.

The adsorption curve shown in FIG. 2 was measured by means of nitrogen adsorption at 77K. The curve indicated by crosses shows the adsorption, while the curve indicated by asterisks shows the desorption. A typical hysteresis is obtained in the relative pressure range of $p/p_0>0.6$. A surface area of 1310 m$^2$/g is determined therefrom for the pores in the pore diameter range of 1.7–30 nm using the BJH model. The corresponding pore volume is 2.18 ml/g, measured at a relative pressure of $p/p_0=0.98$. The most frequent pore diameter is about 8 nm.

In addition, an X-ray diffraction pattern was measured using Cu—Kα radiation of wavelength 0.15406 nm. The diffraction pattern is shown in FIG. 3. In the diffraction pattern, no sharp signals are detectable at angle values of $2\theta>4°$, but a strong scatter contribution is detectable at angle values of $2\theta<4°$.

We claim:

1. A process for the preparation of mesoporous silica comprising converting a silica precursor in a water-containing reaction medium to form said mesoporous silica, wherein the reaction medium contains a polymer dispersion.

2. A process as claimed in claim 1, wherein the polymer dispersion is cationic.

3. A process as claimed in claim 1, wherein the silica precursor is used in the form of an organic silicon compound or of a silicon salt or in the form of waterglass or pyrogenic silica.

* * * * *